United States Patent
Devries (10) Patent No.: US 10,095,789 B2
(45) Date of Patent: Oct. 9, 2018

(54) METHOD AND SYSTEM OF SEARCHING COMPOSITE WEB PAGE ELEMENTS AND ANNOTATIONS PRESENTED BY AN ANNOTATING PROXY SERVER

(76) Inventor: Derek A. Devries, San Francisco, CA (US)

( * ) Notice: Subject to any disclaimer, the term of this patent is extended or adjusted under 35 U.S.C. 154(b) by 468 days.

(21) Appl. No.: 13/594,847

(22) Filed: Aug. 26, 2012

(65) Prior Publication Data

US 2014/0059419 A1 Feb. 27, 2014

(51) Int. Cl.
*G06F 17/30* (2006.01)

(52) U.S. Cl.
CPC ............................ *G06F 17/30864* (2013.01)

(58) Field of Classification Search
USPC ...... 715/233; 707/999.003, 999.005, 999.01, 707/782
See application file for complete search history.

(56) References Cited

U.S. PATENT DOCUMENTS

| | | | |
|---|---|---|---|
| 7,363,291 B1* | 4/2008 | Page | 707/706 |
| 2004/0210602 A1* | 10/2004 | Hillis | G06F 17/3089 |
| 2007/0011355 A1* | 1/2007 | Levenberg | 709/246 |
| 2007/0198500 A1* | 8/2007 | Lucovsky | G06Q 30/02 |
| 2008/0294610 A1* | 11/2008 | Strosaker et al. | 707/3 |
| 2009/0307215 A1* | 12/2009 | Ball | G06F 17/30867 |
| 2011/0010397 A1* | 1/2011 | Kathpal | 707/802 |
| 2011/0184893 A1* | 7/2011 | Paparizos et al. | 706/12 |
| 2011/0219025 A1* | 9/2011 | Lipson et al. | 707/769 |
| 2011/0258174 A1* | 10/2011 | Badros et al. | 707/706 |
| 2011/0264653 A1* | 10/2011 | Cierniak | G06F 17/30011 707/723 |
| 2012/0078955 A1* | 3/2012 | Boguraev | A61B 5/00 707/769 |
| 2013/0086105 A1* | 4/2013 | Hammontree | G06F 17/30864 707/769 |
| 2013/0268511 A1* | 10/2013 | Bailey | G06F 17/30899 707/722 |

OTHER PUBLICATIONS

Tom Yeh, A Case for Query by Image and Text Content, Mar. 28, 2011, pp. 1-10.*
Shenghua Bao, Optimizing Web Search Using Social Annotations, 2007, Session: Search Quality and Precision, pp. 501-509 (Year: 2007).*

* cited by examiner

*Primary Examiner* — Kavita Padmanabhan
*Assistant Examiner* — Ahmad M El-Bkaily (57) ABSTRACT

In one exemplary embodiment, a computer-implemented method includes searching a database of annotations associated with an annotating proxy server. An annotated web page is obtained. The annotated web page can include an annotated web-page element. An annotation of the annotated web-page element can be included in the annotated web page by an annotating proxy server. The annotation can be stored in a database of web page annotations. The annotated web page can be annotated with a query field. A user-generated search query can be received in the query field. The database of web page annotations can be searched according to the user-generated search query.

7 Claims, 8 Drawing Sheets

METHOD AND SYSTEM OF SEARCHING COMPOSITE WEB PAGE ELEMENTS AND ANNOTATIONS PRESENTED BY AN ANNOTATING PROXY SERVER

CROSS-REFERENCE TO RELATED APPLICATIONS

This application claims priority from pending U.S. application Ser. No. 13/274,330, titled METHOD AND SYSTEM OF GENERATING COMPOSITE WEB PAGE ELEMENTS WITH AN ANNOTATING PROXY SERVER, and filed Oct. 15, 2011. The application is hereby incorporated by reference in its entirety for all purposes.

BACKGROUND OF THE INVENTION

1. Field

This application relates generally to web browsing and proxy servers, and more particularly to a system and method of searching composite web page elements and annotations presented by an annotating proxy server.

2. Related Art

Web applications have become increasingly popular as a result of their flexibility of deployment and their relatively intuitive interfaces. Moreover, online social networks have expanded the ability of end user of the Internet to interact with each other and share information, in a conventional online social networking experience a user logins and can view activities of friends on web pages that have been formatted and designed by the online social network administrator. If the online social network experience occurs on a web page that is not controlled by the online social network it can be relegated to a specified location in the web page such as a discussion section of the web page. Users are not able to share information with other users (such as social network connections) regarding other elements of the web page and have this information integrated into the other elements.

Thus, a method and system are desired for searching composite web page elements and annotations presented by an annotating proxy server to improve beyond existing methods of sharing information across the Internet.

BRIEF SUMMARY OF THE INVENTION

In one embodiment, a computer-implemented method includes the step of obtaining an annotated web page. The annotated web page is included an annotated web-page element. An annotation of the annotated web-page element is included in the annotated web page by an annotating proxy server. The annotation is stored in a database of web page annotations. The annotated web page can be annotated with a query field. A user-generated search query is received in the query field. The database of web page annotations is searched according to the user-generated search query.

BRIEF DESCRIPTION OF THE DRAWINGS

The present application can be best understood by reference to the following description taken in conjunction with the accompanying figures, in which like parts may be referred to by like numerals.

FIGS. 6 A-B depict an example of an embodiment used to generate a hybrid search query according to process 500, according to some embodiments.

DETAILED DESCRIPTION OF THE INVENTION

Disclosed are a system, method, and article of manufacture of searching composite web page elements and/or annotations presented by an annotating proxy server. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming software modules, attendee selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary System Architecture

Figure 1:
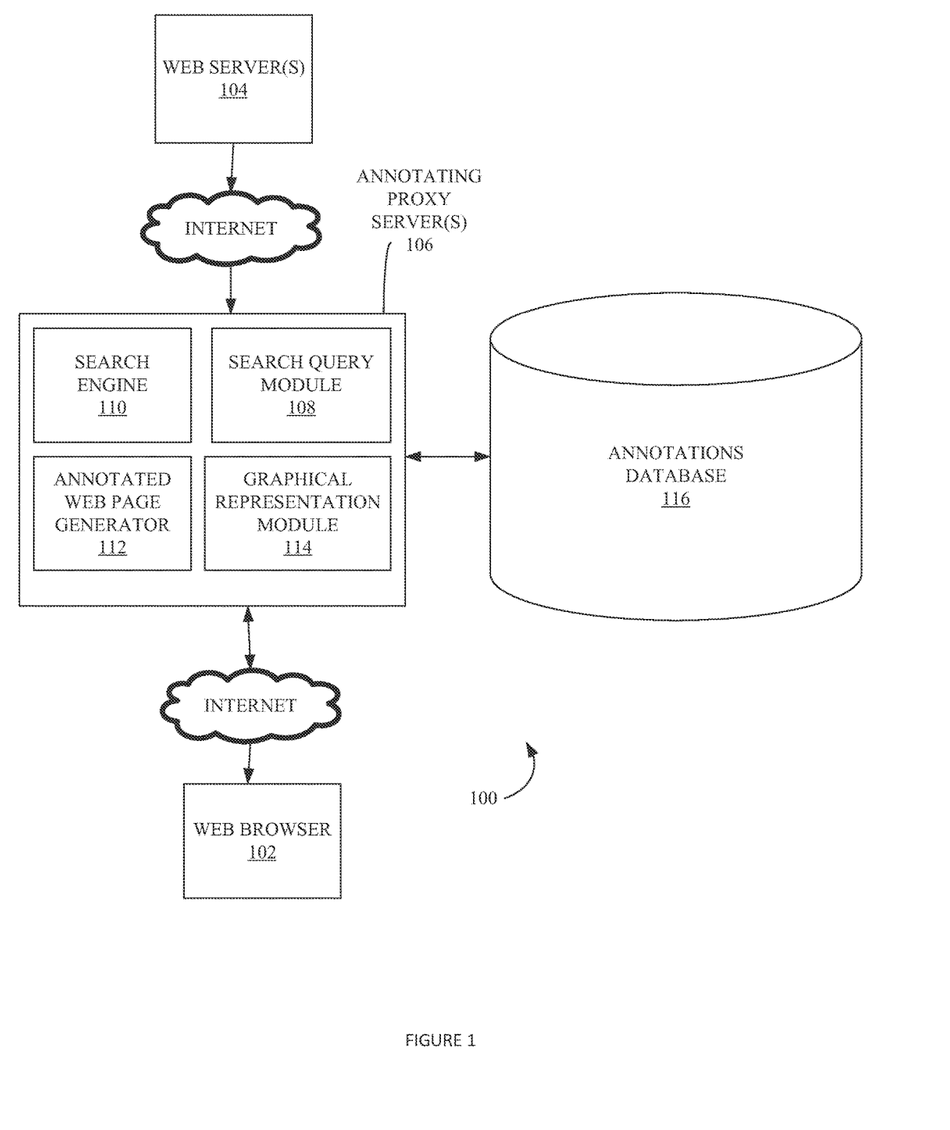
FIG. 1 illustrates an example annotating proxy server system, according to some embodiments.

FIG. 1 illustrates an example annotating proxy server system with annotation search functionalities, according to some embodiments. Annotating proxy server system 100 can include an annotating proxy server 106 (a computer system and/or an application) that acts as an intermediary for requests from client(s), such as web browser 102, seeking resources from other servers, such as web server 104. A client connects to the annotating proxy server, requests some service, such as a file, connection, web page, or other resource available from a different server. Annotating proxy server 106 can evaluate the request and obtain the service from another server. Annotating proxy server 106 can fluffier annotate the request. For example, annotating proxy server 106 can parse the service and match previously generated user-provided annotations (e.g. as stored in annotations database 116). Annotating proxy server 106 can then provide the annotated service (e.g. an annotated web page) to the client. Annotating proxy server 106 can cache various annotated services based on some administrator specified metric (e.g. regency, frequency of request, user id, and the like). Annotating proxy server 106 can enable a user to annotate various elements of the annotated service as well.

As used herein, an annotation can be a comment associated with a web-page document (and/or other service or resource available from a different server). The annotation itself can be text and/or a media file (e.g. audio, image and/or video). Annotating proxy server system 100 can merge annotations into target documents as they are pulled through the server such that the client device views the annotations in the web-page document (and/or other service or resource available from a different server).

Annotating proxy server 106 can evaluate the request according to its filtering rules. For example, it may filter traffic by internet protocol (IP) address or protocol. If the request is validated by the filter, the proxy provides the resource by connecting to the relevant server and requesting the service on behalf of the client. A proxy server may optionally alter the client's request or the server's response, and sometimes it may serve the request without contacting the specified server. In this case, it 'caches' responses from the remote server, and returns subsequent requests for the same content directly. Annotating proxy server 106 can include a registration module (not shown) whereby users can create accounts and register with the annotating proxy server system 100. In some embodiments, annotating proxy server 106 can perform a role similar to a network switch in linking two networks. In this way, proxy server 106 can serve as a gateway to a local proprietary network, of which the users are members, to the Internet.

Annotating proxy server 106 can include one or more search-related functionalities that enable a user of a client device to search annotations database 116 as well as annotated services (such as annotated web pages and/or annotated web page elements). Search-related functionalities can include search engines, graphical displays that display information related to search input and/or search output, search input fields, and the like. As shown, annotating proxy server 106 can include search query module 108, search engine 110, graphical representation module 114 and annotated web page generator 112.

Annotated web page generator 112 can generate an annotated web service such as an annotated web page for a client. The annotated web page can include annotated web page elements. The annotation can be submitted by other users of the annotating proxy server 106. Annotations can be made available to the client based on various factors such as social networking status of a user of the client device, etc. Annotations can be text, images, video, audio files and/or any combination thereof. In one example, the web page can be parsed into various elements. Annotations can be determined by mapping the elements (along with web page identifiers such as URL, source server, etc.) with annotation files including user-generated annotations such as text, images, videos, audio and/or any combination thereof. Other methods of matching annotations with web page elements can be utilized (e.g. mapping web page display coordinates with annotations set to certain display coordinates for the corresponding web page).

Annotated web page generator 112 can also provide various user-input fields and methods to associate searches with an annotated element. For example, annotated elements can also include fields where user can input text and other file types to be used to search annotations database 116. These fields may not be initially displayed and a user may have to perform some prior action(s) e.g. click with mouse, activate drop down menu) to have the input field(s) available.

Search input and output displays can be generated by graphical representation module 114. Graphical representation module 114 can annotate the service search input fields as well as display instructions (e.g. with a markup language).

Annotations database 116 can include various databases of user generated annotations, associated service element information (e.g. annotated web-page elements), metadata about annotations and/or annotated services (e.g. where to find—URLS, metadata, etc.). Annotations database 116 can store image and/or video files of annotated service elements. Annotations database 116 can store past search queries and metadata about said search queries (e.g. entity that submitted query, search results, and the like). Annotations database 116 can also include information and/or metadata about web pages, files and other resource associated with a service.

Graphical representation module 114 can, inter alia, generate a graphical representation of the user profile information. For example, graphical representation module 114 can utilize a common set of graphical elements for a social network and/or obtain graphical elements of the web page. These elements can be modified to include the relevant user profile information obtained by user information filter (not shown). Optionally, user information filter can also filter user profile information by other parameters such as time stamp of information input, location of user, user demographics, etc.). Annotated web page generator 112 can integrate the graphical representation of the user profile information with web page elements into web page annotations. For example, annotated web page generator 112 can include a server-side scripting engine that takes the code and other data that makes up the web page and the user profile information and integrates it with annotation markups. For example, annotated web page generator 112 can utilize server-side scripting language originally designed for web development to produce dynamic web pages. Annotated web page annotations can include attributes of both the web page element and the user profile information. Optionally, annotated web page annotations can also include attributes of recently visited web pages as well. It should be noted that data utilized by the proxy server 106 can be stored in a cache (e.g. in server data store 208 of FIG. 2 below) for later use.

Graphical representation module 114 can generate a search query panel wherein a user can select/upload various inputs for the search of the annotations data base 116. A user can select as search input various attributes of the annotated web service (e.g. web page) such as an annotated web page element, a portion of an annotation, user input text, user uploaded image(s), user uploaded audio file(s), and/or user uploaded video file(s). Graphical representation module 114 can provide this information to search query module 108.

Graphical representation module 114 can further provide a display of search query results. For example, summations of annotation results can be provided on a separate web page with links to the various annotations and associated annotated web pages. In another example, graphical representation module 114 can generate a deck display that overlaps the annotated web page. Each element of the deck display can include a search result as well as a hyperlink to said result. A user can 'scroll' through the deck in order to select a desired result. In another example, search results can be integrated into the annotated document itself. For example, an integration engine (not shown) can include the search results into an HTML code of the annotated web-page document. In yet another example, the search results can be provided in a child window. It is noted that in some examples, the annotations themselves, can be included in child windows that hover over and/or proximate to the respective annotated element and/or are integrated into the HTML code of the underlying web-page document for display within and/or proximate to the respective annotated element.

As previously noted, annotating proxy server 106 can include at least one search engine 110. Search engine 110 can include an information retrieval system designed to help find information stored annotation database 116 as well as the Internet. Search engine 110 can include an indexer that collects, parses, and stores data to facilitate fast and accurate information retrieval. Search query results can be provided to graphical representation module 114.

Search query module 108 can parse annotation search-field input and generate a search query for search engine 110. As noted, user search input can include various attributes of the annotated web service (e.g. web page) such as an annotated web page element, a portion of an annotation, user input text, user uploaded image(s), user uploaded audio file(s), and/or user uploaded video file(s). If a user inputs plain text, this text can be provided as the search query, in the case of a file (e.g. audio, image video), search query module 108 can parse the file and utilize various metadata found therein as text for the search query. In the case of an uploaded image file, the search query can perform an image recognition algorithm(s) on the image and determine a text list of its identity and/or identity of composite parts of the image. This text list can be included in the search query with the metadata (e.g. time stamp, origin, file names, color attributes, file size, etc.). In the case of the web page element, alt tags and other markup information e.g. HTML attributes and the like) can be used as text to be included in the search query. Search query module 108 can provide the constructed search query to search engine 110. Optionally, search query module 108 can also look up search terms in a digital dictionary and/or thesaurus to populate the search terms with additional terms.

Search query module 108 can also generate hybrid search queries in some embodiments. A hybrid search query can include a search query generated from two or more audio, image and/or video files. Search query module 108 can mix randomly selected terms from the list of terms obtained from provided files to create a new list of search terms. Search query module 108 can iterate through this process for n-number of specified times (e.g. as provided by the searching user and/or a default provided by a system administrator) to generate more than one set of search query terms for search engine 110. Search engine 110 can perform successive searches for each query and graphical representation module 114 can bundle the multiple results into a single result for user review.

For example, the annotated web page element can be an image of a blue letter 'G'. Search query module 108 can parse the image to generate a search term list of: blue, 'letter G'. A user can upload an image of a white cat into the search field associated with the annotation. Search query module 108 can parse the image and generate a search term list of: white, cat. Thus, two search term sets can be provided to search engine 110. A first search term set can include: blue, cat; and a second search term list can include: white, letter 'G'. Search engine 110 can search annotations database 116 and for each query. The results of each search query can then be aggregated and provided to the user. The results can include, for example images of white letter 'G's, blue cats that have been previously annotated, the previously provided annotations, information about the user that provided the annotation, previous searches that yielded similar results, and the like.

Figure 2:
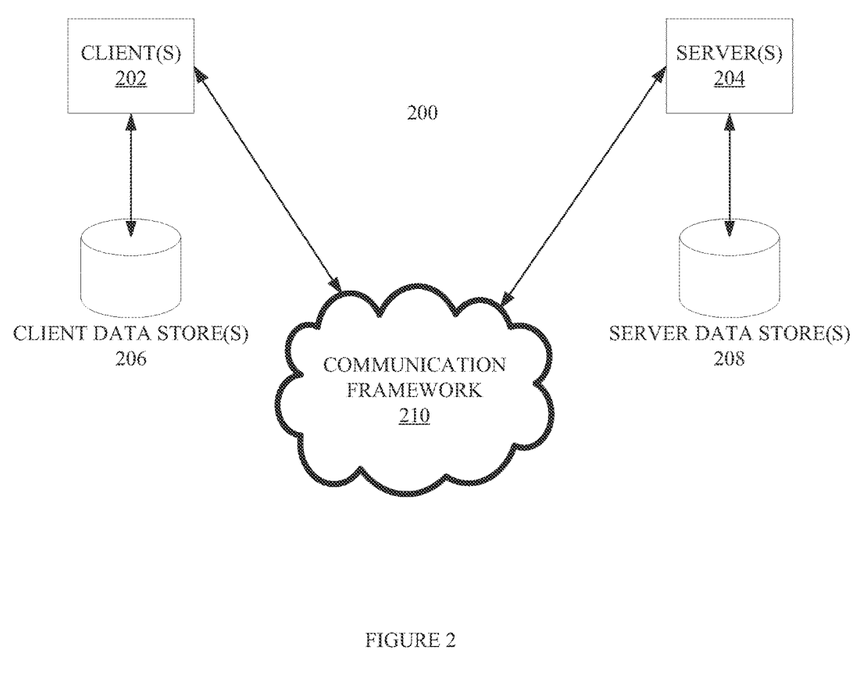
FIG. 2 is a block diagram of a sample computing environment that can be utilized to implement some embodiments.

FIG. 2 is a block diagram of a sample computing environment 200 that can be utilized to implement some embodiments. The system 200 further illustrates a system that includes one or more client(s) 202. The client(s) 202 can be hardware and/or software (e.g., threads, processes, computing devices). The system 200 also includes one or more server(s) 204. The server(s) 204 can also be hardware and/or software (e.g., threads, processes, computing devices). One possible communication between a client 202 and a server 204 may be in the form of a data packet adapted to be transmitted between two or more computer processes. The system 200 includes a communication framework 210 that can be employed to facilitate communications between the client(s) 202 and the server(s) 204. The client(s) 202 are connected to one or more client data store(s) 206 that can be employed to store information local to the client(s) 202. Similarly, the server(s) 204 are connected to one or more server data store(s) 208 that can be employed to store information accessible by the server(s) 204. In some embodiments, system 200 can be included and/or be utilized by the various systems and/or methods described herein. System 200 can also be implemented in a cloud computing environment.

Figure 3:
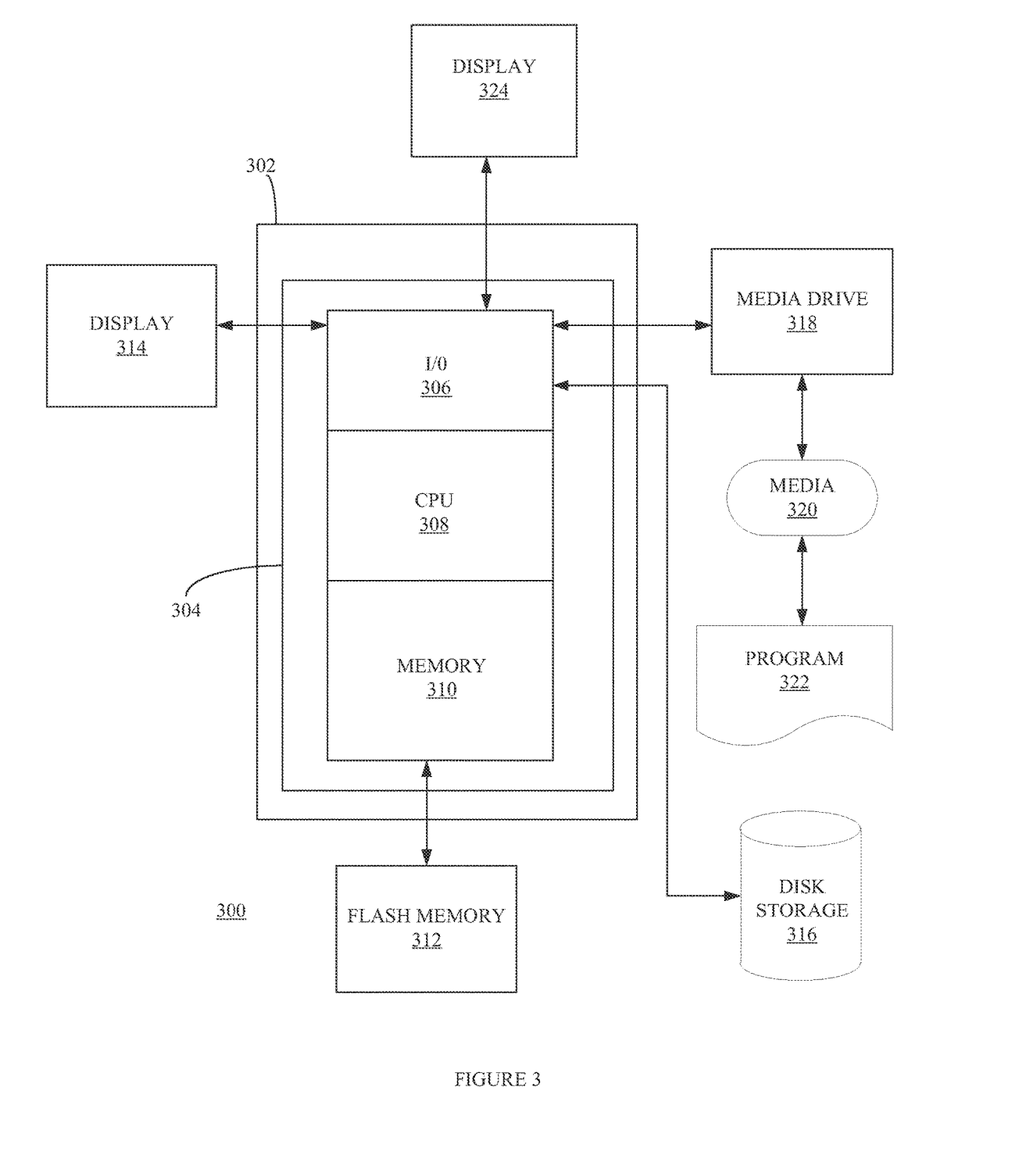
FIG. 3 depicts an exemplary computing system that can be configured to perform any one of the processes provided herein, according to some embodiments.

FIG. 3 depicts an exemplary computing system 300 that can be configured to perform any one of the processes provided herein. In this context, computing system 300 may include, for example, a processor, memory, storage, and devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an PO section 306, one or more central processing units (CPU) 308, and a memory section 310, which may have a flash memory card 312 related to it. The I/O section 306 can be connected to a display 314, a keyboard and/or other attendee input (not shown), a disk storage unit 316, and a media drive unit 318. The media drive unit 318 can read/write a computer-readable medium 320, which can include programs 322 and/or data. Computing system 300 can include a web browser. Moreover, it is noted that computing system 300 can be configured to include additional systems in order to fulfill various functionalities. Display 314 can include a touch-screen system and/or sensors for obtaining contact-patch attributes from a touch event. In some embodiments, system 300 can be included and/or be utilized by the various systems and/or methods described herein.

Process Overview

Figure 4:
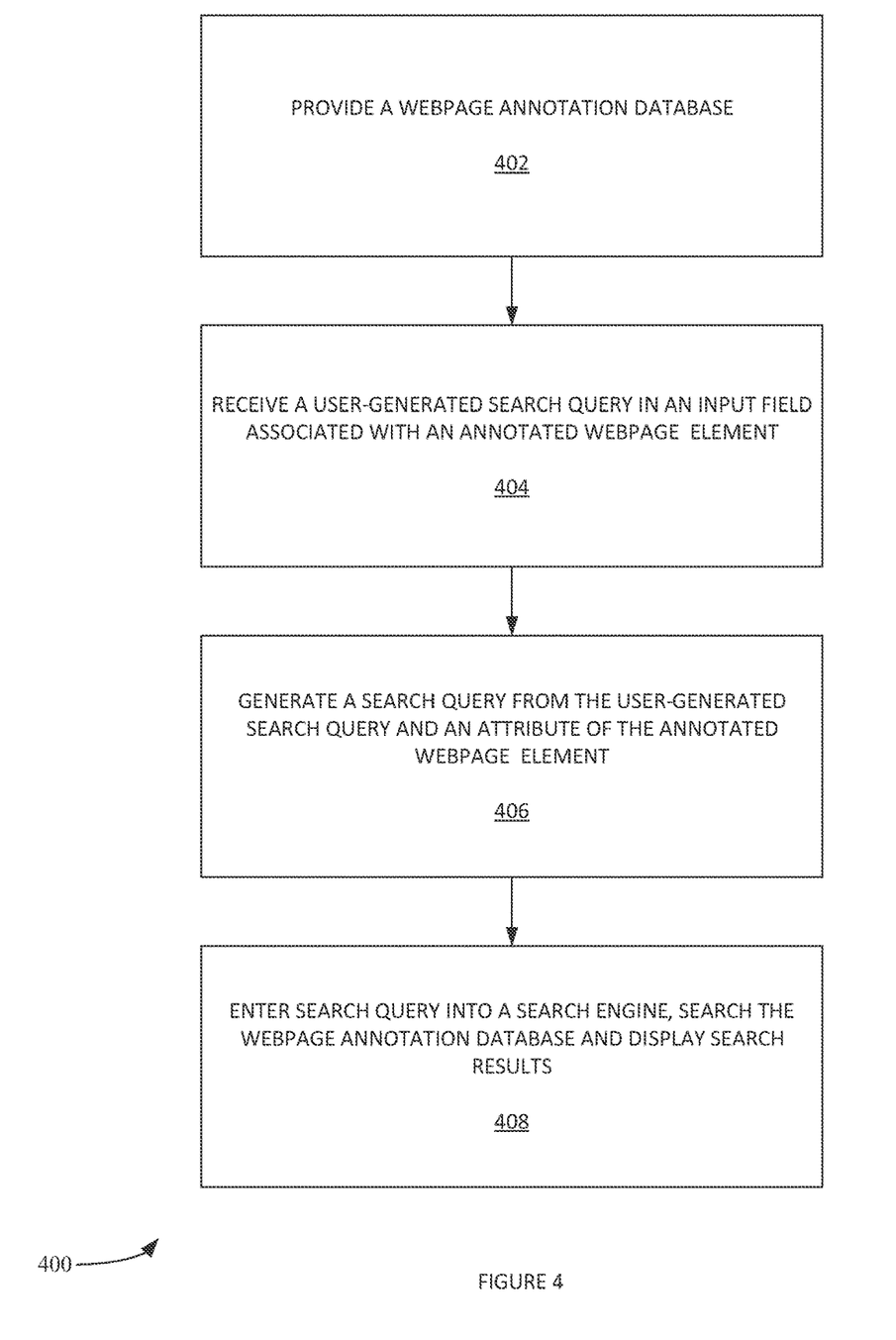
FIG. 4 illustrates an exemplary process for searching composite web page elements and/or annotations presented by an annotating proxy server, according to some embodiments.
Figure 5:
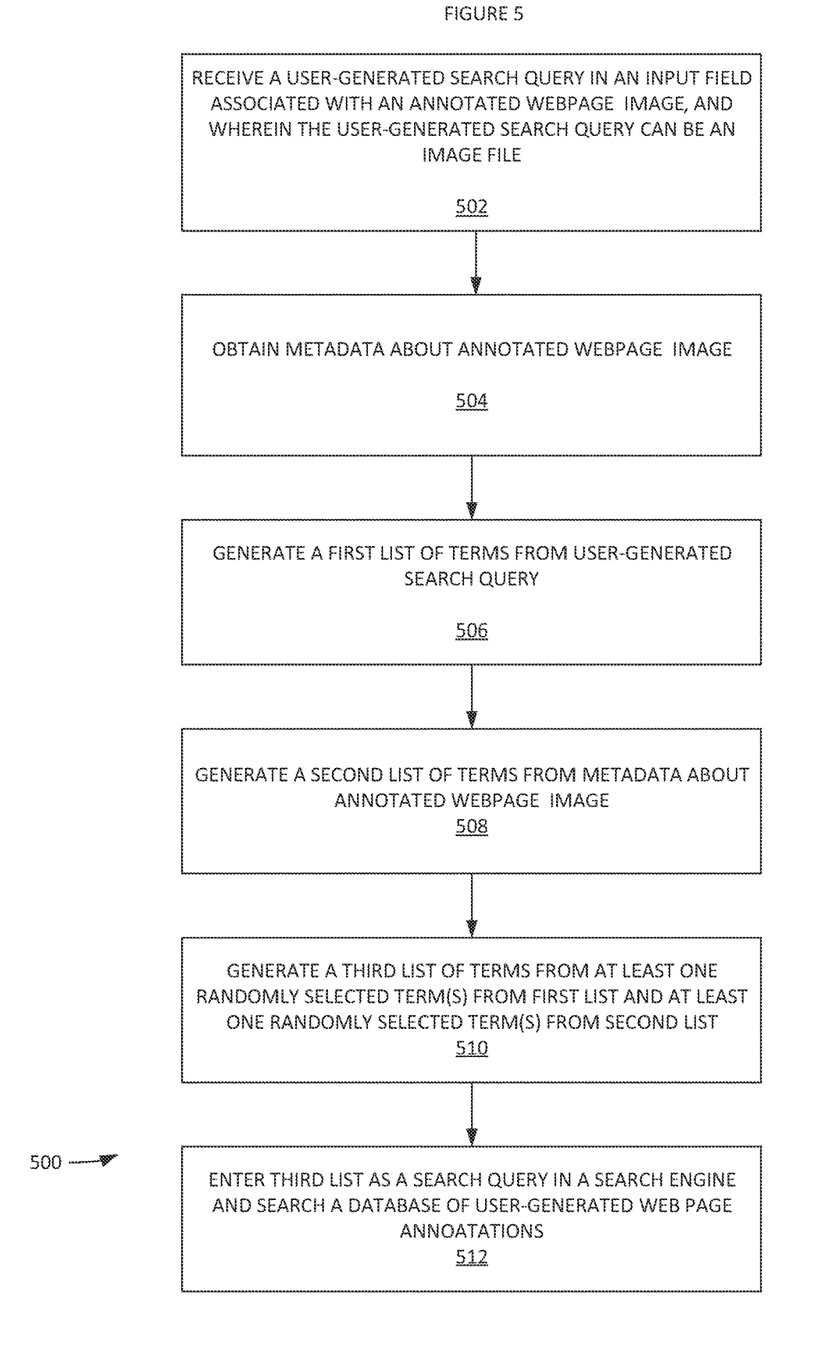
FIG. 5 illustrates an exemplary process for generating a hybrid search query, according to some embodiments.

Regarding FIGS. 4-5, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with some embodiments, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with some embodiments.

FIG. 4 illustrates an exemplary process 400 for searching composite web page elements and/or annotations presented by an annotating proxy server. In step 402, a web page annotation database is provided (e.g. annotations database 116). It is noted that, in other example embodiments, process 400 can be applied to other services resources in lieu of a web page.

In step 404, a user-generated search query is received in an input field of the web-page document. The input field can be associated with an annotated web page element. For example, the input field can be included in the web-page document as an annotation by an annotating proxy server (e.g. annotating proxy server(s) 106). The query input field can be injected into and/or presented with the web-page document in a variety of formats (e.g. input field script can be injected into web-page document script, input field can in a pop-up that 'hovers' near the associated annotated element, and the like). The query input field can accept various types of input such as text, uploaded media files, etc. Media files can be uploaded into query input field by various operations such as pull down menus that access computing device files, drag and drop operations, etc. An annotated element can be any web page element that has been previous annotated by a user. Annotations themselves can be input and/or associated with web page elements by a variety of techniques (e.g. annotation input fields that are similar to the query input field, with a separate annotation application, etc.). The annotations are then stored in web page annotation database for later retrieval and use by an annotating proxy server.

In step 406, a search query is generated based on the user-generated search query and/or an attribute of the annotated web page element. For example, a search query can be generated by search query module 108 according to the various methods described supra. A search query can include information input in the query input field by a user, attributes of the annotated web-page element and/or elements of user annotations. In some examples, a user can determine the composition of the search query. In other examples, some of the search query composition can be algorithmically generated. For example, a user can input a term into the query input field and one or more attributes of the annotated element can be randomly selected as another aspect of the search query.

In step 408, the search query is entered in a search engine. The search engine can operate in a server that manages the web page annotation database. The web page annotation database is searched according to the search query contents and a result can be provided to the user. Process 400 can be implemented in a client-server and/or cloud-computing environment.

FIG. 5 illustrates an exemplary process 500 for generating a hybrid search query, according to some embodiments. In step 502, a user-generated search query is received in an input field. The input field can be associated with an annotated web page image. The user-generated search query can include an image file. In step 504, metadata about the annotated web-page image is obtained. The metadata can include such information as all, tags, markup language content, image tag text and/or attributes, image attributes (e.g. file size, color content, source, time stamp data, and the like), etc.

In step 506, a first list of terms is generated from the user-generated search query, if the user-generated search query includes text, the text terms can be included in the first list. If the user-generated search query includes an image, then metadata about the image can be included in the first list. It is noted that the user-generated search query can include both text and/or an image. In step 508, a second list is generated with information about the annotated web-page image. The second list can be generated from the list of metadata about the annotated web-page image, the file (e.g. the web-page document) that includes the web-page image, and the like.

In step 510, a third list is generated. The third list can include terms randomly selected from the first and second lists, in step 512, the third list is entered as a search query into a search engine. The search can be performed on a database of annotations maintained by an annotating proxy server. For example, the database can include a database of user-generated web-page annotations. Steps 510 and 512 can be repeated for a specified number of iterations and/or until all possible combinations of the terms have been searched.

Example Use Cases

Figure 6A:
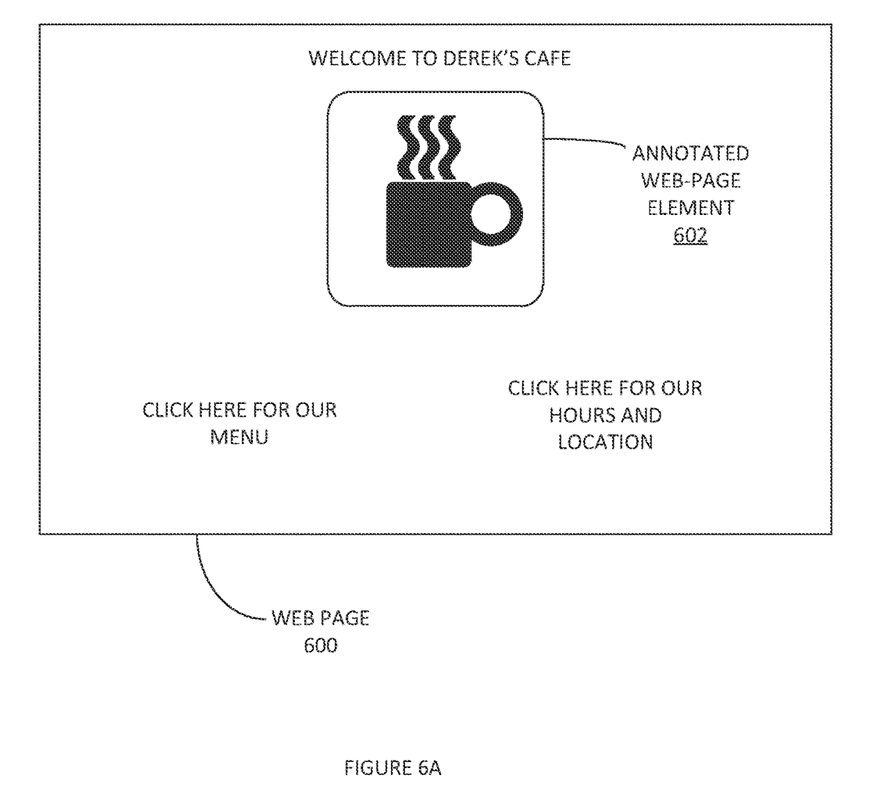
Figure 6B:
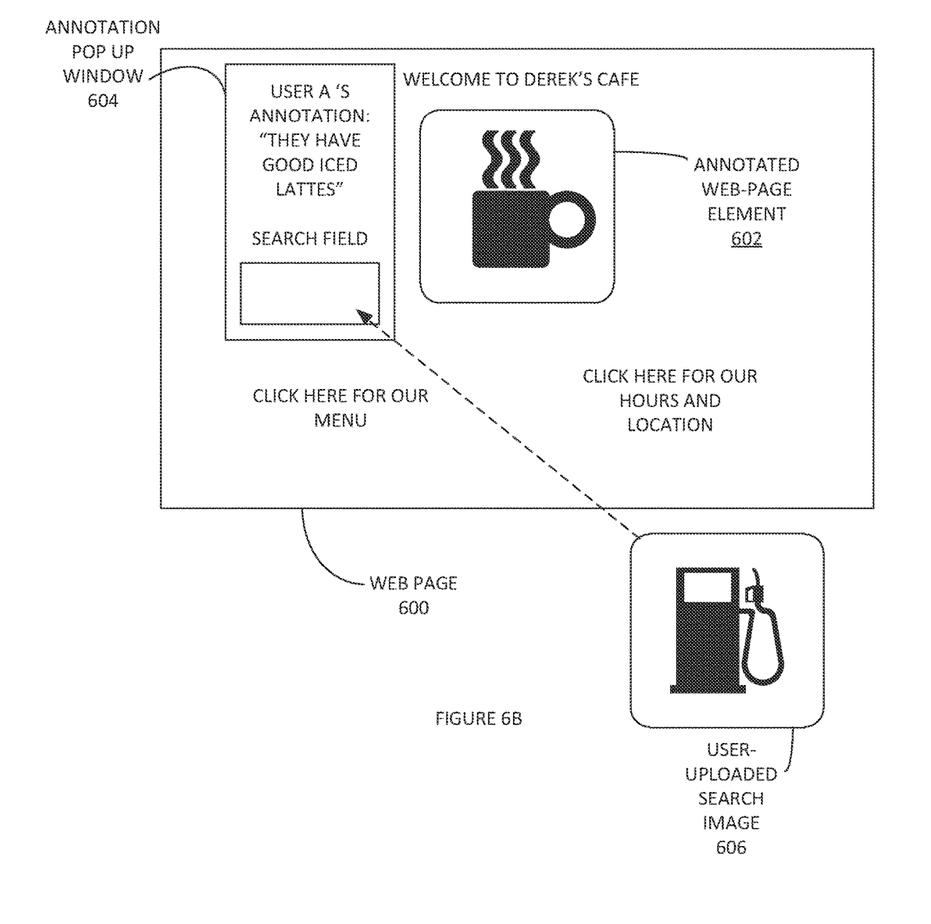

FIGS. 6 A-B depict an example of an embodiment used to generate a hybrid search query according to process 500, according to sotrle embodiments. More specifically, FIG. 6 A-B depict a web-page document 600 displayed with a user computer device. Web-page document 600 can include an annotated web-page element 602. In this example, the annotated web-page element 602 can be an image of a cup of coffee. A user can access the annotation(s) 604 associated with annotated web-page element 602 (e.g. by right-clicking on the element, with a web browser drop down menu, etc.). In the present example, the annotation 604 is presented as a pop-up window that hovers near the annotated web-page element 602. The pop-up window can include a search field. A user can input a search query into the search field (e.g. by dragging and dropping another image such as image 606 into the search field). In the present example, the annotated web-page element 602 can be parsed and a list of terms generated. For example, the terms—'cup', 'coffee'—can be generated from the image. Also, additional sources can be utilized to obtain terms for the list. For example, the underlying web page document's metadata and/or content can be utilized as well. Thus, in one example, the list can be expanded to include the terms—'Derek' and 'café'—as well as the location of Derek's café (e.g. by state, town, and the like).

The user uploaded query image 606 can also be parsed and a list of terms generated from its metadata, content and/or attributes. For example, the terms—'gasoline' and 'fueling station'—can be generated. For example, an image recognition algorithm can be used to determine the content of the uploaded digital image. Additionally, a thesaurus, dictionary or other resource can be utilized to select additional terms closely related to the content of the image. Optionally, other sources of metadata can be utilized such as information/metadata about the image (e.g. geolocation data in the image, colors of image, etc.).

Optionally, one or more additional lists can be generated from other relevant sources such as the annotation(s), past queries inputted into the particular search field, the web page document contents and the like.

The two lists can be combined (e.g. members of each list can be randomly or orderly selected) to generate one or more search queries. For example, one search query can be—'Derek', 'fueling station'. Another search query can be—'café', 'iced', 'gasoline', and 'San Francisco' (assuming Derek's café is located in San Francisco, Calif. for example). Various searches can be performed (e.g. of the Internet, of a database of user-generated annotation associated with an annotating proxy server, etc. The results can be provided in various formats such as a list of the returned annotations with links to the attached annotated document. In this way, annotations can be returned that include information on such topics as: gas stations that sell ice, energy efficiency in San Francisco, and the like. For example, another user may have annotated a gas station's web page with an annotation: 'The ice and coffee here are cheap'. This annotation could be returned as a result along with a link to the annotated gas station's web page.

It is noted that the annotated web page can be a web page that includes search results provided by a search engine. A user can annotate the search results. An annotation of a search result can include information such as: how relevant the search result is to the user, a user's comments about a web page linked to through a portion of the result, and the like. In some embodiments, the list of search results can be ranked according to the content of the user's annotations. The search results can then be redisplayed based on the content of the user's annotations. For example, some search results can be removed based on negative annotations, white others can be ranked higher based on positive user annotations. Additionally, a new search can be performed that includes a portion of the content of the user's annotations. The search results can be updated based on the results of this subsequent search. In some embodiments, a web page that includes search results can also include annotations by other users of the annotating proxy server system.

Figure 7:
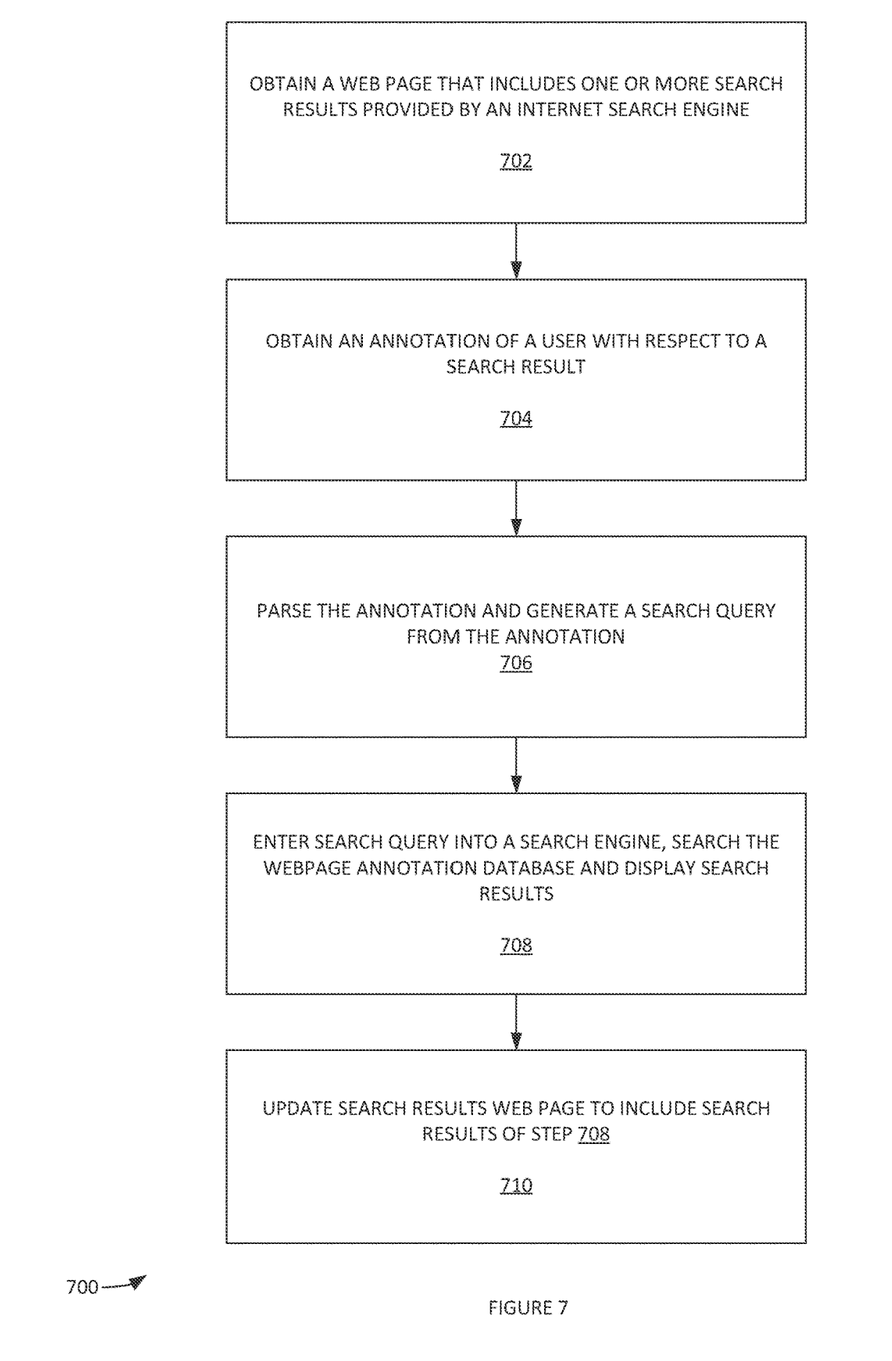
FIG. 7 depicts an example process of modifying an internet search engine results based on user-provided annotations of an Internet search engine results web page, according to some embodiments.

FIG. 7 depicts an example process 700 of modifying an Internet search engine results based on user-provided annotations of an Internet search engine results web page, according to some embodiments. In step 702, a web-page that includes one or more search results provided by an Internet search engine (e.g. a Google search result obtained via proxy server 106) is obtained. The web page can be parsed such that the individual search results are available to be annotated. In step 704, an annotation provided by a user with respect to a search result is obtained (e.g. with system 100). In step 706, the user annotation is parsed and a search query is generated. Step 706 can be performed according the methods provided supra. In step 708, the search query is entered into a search engine (e.g. search engine 110). A webpage annotation database (e.g. annotations database 116) is searched. Optionally, these search results can be displayed. Additionally, in step 710, the Internet search engine results web page can be updated to include the results of step 708.

Conclusion

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method comprising:
   obtaining are annotated web Page, from an annotating proxy server, wherein the annotated web page comprises an annotated web-page element, wherein an annotation of the annotated web-page element is included in the annotated web page by an annotating proxy server, and wherein the annotation is stored in a database of web page annotations;
   annotating the annotated web page to include a query field;
   receiving a user-generated search query from the query field, wherein the user-generated search query is algorithmically generated from a term of a user annotation of the annotated web page and a user-provided image file, and wherein the term of the user annotation comprises a user comment that has merged into the annotated web page by an annotating proxy server before obtaining the annotated web page;
   searching the database of web page annotations according to the user-generated search query and an annotated web-page element attribute;
   determining the annotated web-page element attribute;

and annotating the annotated web page with a result of the search of the database of web page annotations according to the user-generated search query and another search of the database of web page annotations based on the user annotation of the search result, wherein the result of the search of the database of web page annotations is merged into a webpage document of the annotated web page;

wherein the annotated web page comprises search result of the search the database of web page annotations according to the user-generated search query and another search of the database of web page annotations based on the user annotation of the search result, wherein the least one characteristic of the image file comprises an image content, image metadata and a geolocation data of the image file, and wherein the user-generated search query comprises a user annotation of a search result.

2. The computer-implemented method of claim 1 further comprising:

determining at least one characteristic of the image file.

3. The computer-implemented method of claim 2 further comprising: performing an image-recognition algorithm on the image file.

4. The computer-implemented method of claim 3, wherein the user-generated search query comprises a text result of the image-recognition algorithm on the image file.

5. An annotated-proxy server system comprising:

an annotating proxy server configured to, with one or more computer processors:

obtain an annotated web page, from an annotating proxy server, wherein the annotated web page comprises an annotated web-page element, wherein an annotation of the annotated web-page element is included in the annotated web page by an annotating proxy server, and wherein the annotation is stored in a database of web page annotations;

annotate the annotated web page to include a query field;

receive a user-generated search query from the query field, wherein the user-generated search query is algorithmically generated from a term of a user annotation of the annotated web page and a user-provided image file, and wherein the term of the user annotation comprises a user comment that has been merged into the annotated web page by an annotating proxy server before obtaining the annotated web page;

search the database of web page annotations according to the user-generated search query and an annotated web-page element attribute;

determine the annotated web-page element attribute; and annotate the annotated web page with a result of the search of the database of web page annotations according to the user-generated search query and another search of the database of web page annotations based on the use annotation of the search result, wherein the result of the search of the database of web page annotations is merged into a webpage document of the annotated web page;

wherein the annotated web page comprises a search result of the search the database of web page annotations according to the use generated search query and another search of the database of web page annotations based on the user annotation of the search result, wherein the least one characteristic image file comprises an image content, image metadata and a geolocation data of the image file, and wherein the user-generated search query comprises a user annotation of a search result.

6. The annotated-proxy server system of claim 5, wherein the annotating proxy server provide an annotated web page that comprises a search result of the search the database of web page annotations according to the User-generated search query.

7. The annotated-proxy server system of claim 5, wherein the annotated web page comprises a list of search results provided by an Internet search engine.

* * * * *